Oct. 21, 1930. F. S. CHAPMAN Re. 17,844
METHOD OF DETECTING PRESENCE AND APPROXIMATE LOCATION OF METALLIC MASSES
Original Filed Nov. 12, 1919
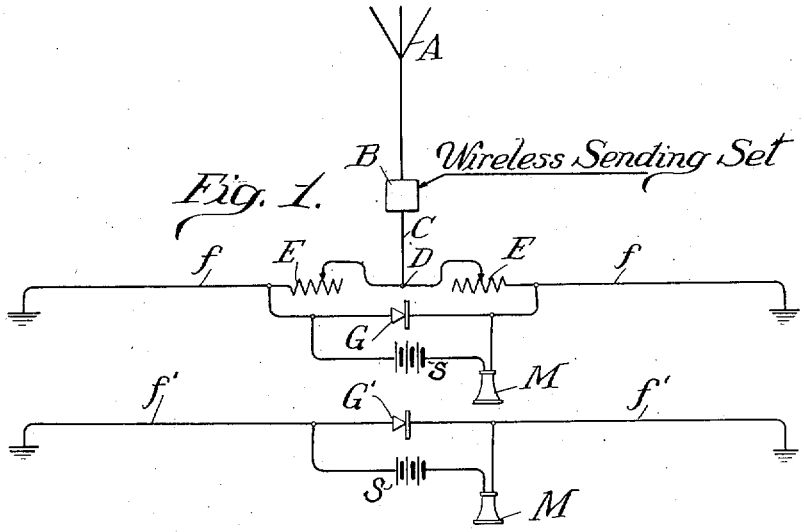
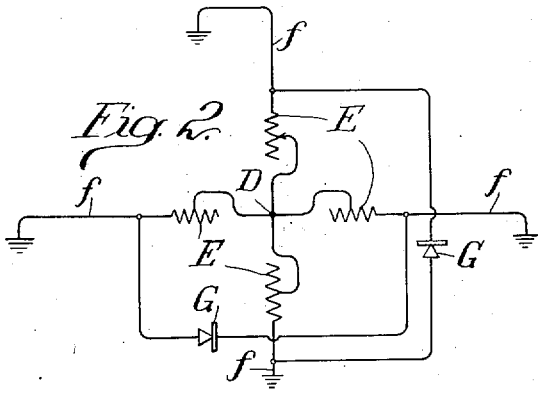
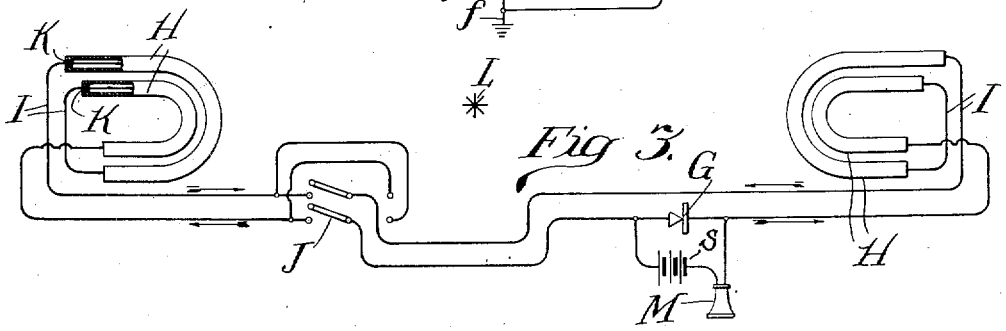
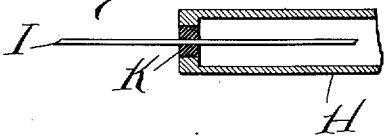
Inventor
Frank Spencer Chapman
By Barrett & Truman
Attorneys Reissued Oct. 21, 1930 Re. 17,844

UNITED STATES PATENT OFFICE

FRANK SPENCER CHAPMAN, OF MAYWOOD, ILLINOIS

METHOD OF DETECTING PRESENCE AND APPROXIMATE LOCATION OF METALLIC MASSES

Original No. 1,564,940, dated December 8, 1925, Serial No. 337,481, filed November 12, 1919. Application for reissue filed December 5, 1927. Serial No. 237,961.

My invention relates to wireless electric communication systems generally, and the object of my invention is—

First, to provide an improved means for receiving wireless impulses from beneath the ground or water-body surfaces;

Second, to provide an improved means whereby wireless electric impulses may be received at the same time wireless electric impulses are being sent;

Third, to provide an improved means whereby the direction of travel of wireless electric impulses may be determined, thus providing means which may be used in the art for other purposes; and Fourth, to provide an improved method of detecting the presence and approximate location of metallic masses or other electrical conducting or wireless-wave reflecting masses.

By the terms "wireless" or "radio" as used herein, I mean to cover waves of any frequency, whether it be in the magnetic field produced by a low frequency source, a frequency in the audio range, or up to the highest radio wave that may be produced.

I attain these objects by the apparatus shown in the accompanying drawings in which:

Fig. 1 shows a portion of a sending-receiving wireless station having a ground-wireless antenna and an aerial antenna; Fig. 2 is merely another view of that portion of Fig. 1 comprising the antennæ *ff*, the function of Fig. 2 being to indicate that the antennæ *ff* of Fig. 1 comprise two sets at right angles to each other; Fig. 3 shows two large loop antennæ for receiving purposes, part of the wire thereof being shielded with iron or other suitable metal tubes. This loop system is in a balanced position with regard to L, a wireless-wave-source representing the central part of the field surrounding A, Fig. 1; Fig. 4 is an enlarged detail of part of H, Fig. 3.

Fig. 1 is a drawing showing the aerial antenna A, the wireless electric sending set B, and a ground wire C leading from B. C is divided at D as shown. EE are variable resistances. *ff* are two branches of C. *ff* comprise what I term the "ground antennæ" and are to be connected to earth or, if used on the sea, are to be "grounded" by being attached to suitable electrodes submerged in the water. G is a detector and M the receiver located in the receiving circuit passing through detector G and receiver M and energized by the battery S associated therewith. G should be placed in the central or balanced position so that when current is flowing to ground from *ff* no current will flow through G. This may be done by well known methods. Under such conditions, impulses may be sent from the system and will not be heard in receiver M. Wireless electric impulses, coming from beneath the ground and traveling parallel with *ff* will cause a current to flow in *ff*, the resistance EE forcing the said current to flow through G and thus operate M.

But if the wireless impulses travel in a direction parallel with the sea surface and at right angles with *ff* no current will flow in *ff*. And by having the "ground" antenna movable this arrangement will provide means whereby the line of direction of the wireless impulses may be determined.

*f'f'* is a second "ground" antenna only. It is used for receiving purposes only and in that respect it will function same as *ff*. Placed closely parallel with *ff* it will be easier to balance against outgoing impulses from this station, as it will not act as a conductor of outgoing current.

Fig. 2 shows two "ground" antennæ arranged at right angles to and crossing each other at the common central point, as shown, and joined at D to which is connected the wireless sending set B and aerial antenna A as in Fig. 1. With this, two messages may be received at the same time, if the direction from which they are coming be at right angles, or approximately so, with each other. Or the whole apparatus may be moved on the position of D as a pivot until, for a given set of impulses being received, no noise is heard in one receiver and the heaviest noise in the other. Thus the line of direction of the impulses under observation may be determined.

Fig. 3 shows two "looped" antennæ located some distance apart with a pair of wires connecting them through the line-reversing switch J. I, I are exposed wires forming part of the "loop", the continuation of which wires enter H, H, which are iron tubes enclosing the continuation of I, I and insulated from the latter to all points. The purpose of H, H is to intercept the radio waves so that they will not cut through the tube-enclosed parts of I, I, so that no current will be induced in such enclosed part of I, I. Were all of the wire of the loop exposed, the wireless waves would induce current in both sides of the loop, of approximately equal strength, but the current from one side of the loop would be in a direction to oppose that from the other, and both would be somewhat neutralized, and hence would be somewhat inoperative as regards the receiver. But by enclosing part of I, I in the tubes as shown, a louder noise will be heard in the receiver and thus messages may be better received. By adding large numbers of turns to the loop, this may be greatly increased. This action of the system as shown depends, however, on the position of J. If it be closed in one position, the output from one of the "looped" antenna will coincide in direction with that from the other, and the effect be to "boost" the voltage and thus increase the receiving efficiency. But, if J be thrown to the other closed position, the two looped antennae will "buck" each other, and if both are at an equal distance from the wireless source, silence in the receiver will result.

Therefore, if "L" be a wireless wave source, (such as A and B, Fig. 1), separated from and at an approximately equal distance from both of the "looped" antennæ, it may be worked and not heard in the receiver, if J be in the "bucking" position. It may be difficult to get absolute silence, but at least the sound will be greatly reduced. But another set of wireless impulses, their source being further from one of the looped antennae than the other and not in a direction parallel to II may be heard in the receiver and not interfered with by "L".

Impulses coming from "L" may cause induced impulses or reflected waves to come from a nearby metal mass and these induced impulses, cutting through the looped antennæ may cause a noise in the receiver, and thus indicate the presence of an otherwise hidden metal mass. In this case, all the apparatus shown in Fig. 3 should be mounted on the same movable base, so that in action "L" will always be at an equal distance from both "looped" antennae. By proper maneuvering, the metal mass may be located. And substantially this same action and result may be had with Fig. 1.

The apparatus shown herein is also described, and claimed in my application for patent dated as filed May 7, 1921, Serial No. 467,782, "wireless communication system", the method of operating only being claimed herein.

Fig. 4 shows an enlarged detail of H with its insulating part K separating I from H.

The method of operation is as follows:

The system is first balanced in a location where it cannot be affected by the presence of any metal, care being taken to see that no such mass exists within its range, except that of the ship or mounting on which it is located, (the balancing takes care of such mounting). Then, assuming that the metal mass which it is desired to locate is beneath the sea surface, the apparatus being mounted on a ship, the said ship is moved continuously in any direction, the sending set B being worked at short intervals. And when at the time of such working, a noise corresponding in time and duration thereto is heard in any of the receivers M, it indicates the presence of a metal mass.

This noise may be first heard in any of the antennæ, and if not in the apparatus covered by Fig. 3, there should be a change of direction of the ship until it is heard in M Fig. 3. The ship is then maneuvered in all possible directions and preferably over as small an area as possible until the noise in M, Fig. 3, ceases or diminishes with comparative suddenness. The ship is then in the same manner as before placed at right angles to the just-found silent position, and if the silence in M, Fig. 3 is still maintained, the ship is over the searched-for metal mass. If not, further maneuvering of the ship must be carried on until the suddenly-arrived-at silence or diminished reception is maintained in M, Fig. 3 in all positions of the ship. Thus the general line of direction between the ship and the metal mass may be determined as also the approximate location thereof.

When the metal mass to be located is beneath the ground, instead of beneath the surface of the sea, the apparatus may be transported from place to place on the earth's surface in the same manner that the ship was maneuvered in the above described operation.

By the expression "balancing out" or "balancing" as used herein in connection with the turning or moving of a receiving loop antenna so that the direction of wave travel may be found, I mean the ceasing or diminishing of reception, caused by two electric currents set up in the said loop antenna in such a way that they oppose each other, and if they are of equal strength they completely neutralize or balance each other. The said turning or moving usually brings about such a condition gradually, causing the said diminishing, and in a perfect operation of this sort final ceasing of reception. But such perfect operation may be rare, and instead of complete silence being attained there may be only a point of minimum reception, which will be adequate for the purposes of this method. In practical operation of this balancing method, the loop antenna of a receiving set is usually turned on its vertical axis during reception until reception ceases, or a point of minimum reception is reached.

There are two distinct forms of balancing simultaneously utilized in this method. First, in each loop the current induced in one side of the loop is opposed to the current induced in the opposite side by positioning the plane of the loop at right angles to the direction of reception of the waves. Secondly, the two loops are balanced against one another by opposing the currents induced in each loop, or the manifestations thereof, against one another. In the apparatus here disclosed by way of example, this is accomplished by the reversing switch J.

I claim:

1. The method of determining the general line of direction between a given position and a metal or other mass capable of returning radio waves which consists in propagating radio waves, intercepting and translating reflex radio waves, and then balancing out the said reflex radio waves or waves resulting therefrom.

2. The method of determining the location of a metal or other mass capable of returning radio waves which consists in propagating radio waves, intercepting and translating reflex radio waves, determining the general line of direction between a given position and the said mass by balancing out reflex radio waves or waves resulting therefrom, then following the said line of direction.

3. The method of decreasing undesirable reception of radio waves in an antenna having a loop circuit, which consists in substantially balancing the said circuit against the said reception, and shielding the said circuit by a radio-reflecting member.

4. The herein described method consisting of moving a radio wave propagating device in a determined direction, propagating radio waves therefrom at intervals, intercepting and translating reflex radio waves and increasing the manifestations of said waves by means of additional currents until said interception and translation ceases or reaches the minimum obtainable for that location, changing the direction of movement of the radio propagating device and again intercepting and translating reflex radio waves until said interception or translation ceases or reaches a minimum for that location.

5. The herein described method consisting of electrically balancing a radio wave propagating and receiving device in a location where the presence of a radio wave reflector is suspected, moving said device along a determined path in respect to said suspected reflector, propagating radio waves at intervals, intercepting and translating radio waves reflecting from said suspected reflector and increasing the manifestations of said waves by means of additional currents until said interception and translation stops due to balancing action or reaches a minimum for that location, and then moving said device in a plurality of directions until said interception and translation again stops due to balancing action or reaches a minimum for that location thereby indicating the approximate location of the reflector.

6. In the operation of a looped antenna radio receiving system, the method of reducing reception of radio waves coming from a given source which consists in transposing the connection with each other of two looped antennæ located at equal distances from the source so that the induced currents are thrown into opposition with each other, and reducing reception of waves coming from a direction at right angles to the direction of the first waves by simultaneously rotating the looped antennæ as a unit about the source of the first waves as a center.

7. The method of determining the location of a metal or other mass capable of returning radio waves, which consists in propagating radio waves, substantially balancing two wave-receiving devices at opposite sides of the source of the propagated waves, reducing direct reception from this source by opposing the currents directly induced in the wave-receiving devices, and rotating the wave-receiving devices as a unit about the source as a center to determine the position of minimum reception of waves returned from the mass.

8. In the operation of a looped antenna radio receiving system, the method of reducing the manifestations of radio waves received from a known source which consists in opposing the energies developed by the currents induced in each of two looped antennæ located at substantially equal distances from this source, and reducing the manifestations of waves received from a direction at an angle to the direction of the first waves by rotating the looped antennæ as a unit about the source of the first waves as a center.

9. The herein described method of locating masses capable of returning wireless waves consisting in propagating wireless waves from a source positioned in a location where the presence of the mass is suspected, and electrically balancing a wireless wave receiving device with respect to direct waves from the source, intercepting and translating reflex wireless waves returned from said mass, until said interception and translation stops or reaches a minimum for that spot due to balancing action, and then successively moving said receiving device in a plurality of directions and repeating the balancing operations in each successive position until said interception and translation again stops or reaches a minimum for that spot.

10. The herein described method of locating masses capable of returning wireless waves consisting in propagating wireless waves from a source positioned in a location where the presence of the mass is suspected, and electrically balancing a wireless wave receiving device with respect to direct waves from the source, increasing the manifestations of received waves by means of additional current, intercepting and translating reflex wireless waves returned from said mass, until said interception and translation stops or reaches a minimum for that particular location due to balancing action, moving the receiving device to a new position in the approximate direction of the mass as thus determined, and repeating the balancing operations in the new position.

11. The herein described method of locating masses capable of returning wireless waves consisting in propagating wireless waves from a source positioned in a location where the presence of the mass is suspected, and electrically balancing a wireless wave receiving device with respect to direct waves from the source, increasing the manifestations of received waves by means of additional current, intercepting and translating reflex wireless waves returned from said mass, balancing the receiving device with respect to these intercepted waves to determine the approximate direction from which the reflex waves are received, moving the receiving device in this determined direction to a new position, and repeating the balancing operations in the new position.

12. The herein described method of locating masses capable of returning wireless waves consisting in moving a wireless wave receiving circuit having balancing properties in the presence of an operating wireless wave propagating circuit, increasing the manifestations of received waves by means of additional current, balancing out direct propagated waves or waves resulting therefrom, and receiving and translating wireless waves or manifestations thereof sent out from the mass as a result of the propagated waves.

13. In methods of finding masses by means of wireless waves, the steps of intercepting and balancing out interfering waves or manifestations thereof, and then intercepting and balancing out waves or manifestations thereof coming from the mass, so as to determine the approximate direction of the mass.

14. In methods of finding masses by means of wireless waves propagated from a known source, the steps of intercepting wireless waves and successively suppressing by balancing action the manifestations of waves from the known source, and then of reflex waves returned from the mass.

15. In methods of finding masses by means of wireless waves, operating a wireless wave propagating circuit, operating a wireless wave receiving circuit that is exposed to the propagated waves or waves returned from a known mass under conditions in which these waves are eliminated or their manifestations suppressed, increasing the manifestations of received waves by means of additional current, then intercepting and translating reflex waves from an unknown mass and balancing the receiving circuit in partially suppress manifestations of these latter waves.

16. In methods of finding masses by means of wireless waves, operating a wireless wave propagating circuit, operating a wireless wave receiving circuit that is exposed to the propagated waves or waves returned from a known mass, positioning said receiving circuit so that these waves are eliminated or their manifestations suppressed, and then making observations by means of said receiving circuit to determine if reflex waves from an unknown mass are being received.

17. In methods of finding masses by means of wireless waves, operating a wireless wave propagating circuit, operating a wireless wave receiving circuit that is exposed to the propagated waves or waves returned from a known mass, positioning said receiving circuit so that these waves are eliminated or their manifestations suppressed, making observations by means of said receiving circuit to determine if reflex waves from an unknown mass are being received, and determining by balancing action the approximate direction from which these latter waves are received.

18. In methods of finding masses by means of wireless waves, operating a wireless wave propagating circuit, intercepting and translating reflex waves returned from the mass and received in a circuit having balancing characteristics, increasing the manifestations of received waves by means of additional current, and moving the receiving portion of this latter circuit so that the waves are intercepted at an angle differing from the original angle of reception, and noting any changes in intensity of reception resulting from this change in angle.

19. In methods of finding masses by means of wireless waves, operating a wireless wave propagating circuit, balancing a receiving circuit so that there are substantially no manifestations therein of direct waves from the propagating circuit, and then manipulating the receiving circuit to alter the manifestations therein of reflex waves and thus determine the direction of the source of these reflex waves.

20. In methods of finding a mass by means of wireless waves, operating a wireless wave propagating circuit, operating a wireless wave receiving device that increases manifestations of received waves by means of additional current and is exposed to waves propagated from the said circuit or radiated from an object whose location is known, said receiving device being in a position in which, if no said mass is present, manifestation of said waves is at a minimum for that particular spot, there observing reception above the said minimum, and moving or rotating the said receiving device until manifestation of waves is at a minimum for that particular spot, thereby finding the said mass.

21. In methods of finding masses, intercepting interfering waves, increasing the manifestations of received waves by means of additional current, balancing out the said waves or waves resulting therefrom and then in the same circuit intercepting and translating waves coming from the mass being searched for, then suppressing their manifestation by a balancing method whereby the line of direction of wave travel is indicated, thus indicating the general direction of the said mass.

22. The method consisting in propagating waves, balancing out these waves or waves resulting therefrom, so that they are not manifest or are at least below the maximum for that spot, in a receiving apparatus capable of increasing the manifestations of these waves, and then in the same receiving apparatus receiving and translating reflex waves.

23. In searching methods, operating an electric circuit, intercepting two sets of waves having their primary power source in the said circuit, suppressing manifestation of one of the said sets of waves by a balancing method, translating, and manifesting the other said set of waves or waves resulting therefrom, thereby indicating the presence of an object.

24. In methods of locating a mass, operating a wave-propagating device whose location is known, thereby causing the said mass to radiate waves which commingle with waves from the said propagating device, intercepting the thus commingled waves, translating and manifesting them or waves resulting therefrom, maneuvering or rotating the intercepting device until, due to direction-finding action, whereby the general direction of wave travel is indicated, manifestation of waves reaches a minimum for that particular spot, thereby finding an indicated general line of wave travel under conditions caused by or as may be changed from the normal by the presence of the said mass, thereby indicating the general direction of the latter.

25. In a method of finding an object by means of waves, the steps of intercepting and balancing out interfering waves or manifestations thereof, and then intercepting waves coming from, or reaction waves caused by the presence of, the said object, translating them and utilizing additional current to increase the manifestations of these waves or waves resulting therefrom, thereby locating the said object.

26. In a finding method, operating an electric circuit intercepting certain waves therefrom, balancing out these waves or waves resulting therefrom, so that they are not manifest, or are at least below the minimum for that spot, intercepting reaction waves coming from or caused by the presence of, an object, translating them, and by utilizing additional current manifesting said waves, or waves resulting therefrom, thereby indicating the presence of an object.

27. In methods of searching for masses by means of wireless waves, operating a wireless wave propagating circuit, operating a wireless wave receiving circuit capable of increasing the manifestations of received waves by means of additional current, and balancing said receiving circuit in positions in which direct propagated wave reception from a known source is eliminated or their manifestations suppressed, and then making observations by means of said receiving circuit to determine if waves from an unknown source are being received.

28. In methods of searching for masses by means of wireless waves, operating a wave-propagating circuit whose location is known, operating a wave receiving circuit capable of increasing manifestations of received waves by means of additional current and making observations by means of said receiving circuit to determine if waves from a mass whose location it is desired to determine are being received, said waves being caused automatically by the said operation of the propagating circuit, and if so, determining by balancing or radio direction finding methods, the approximate direction from which the said waves from a mass are being received, thereby locating the mass.

FRANK SPENCER CHAPMAN.